United States Patent
Hirt et al.

[11] Patent Number: 6,032,011
[45] Date of Patent: Feb. 29, 2000

[54] PROCESS AND DEVICE FOR IMAGE-DIFFERENTIATED INKING OF A LATENT ELECTROSTATIC IMAGE

[75] Inventors: Alfred Hirt, München; Robert Weiss, Gersthofen, both of Germany

[73] Assignee: MAN Roland Druckmaschinen AG, Offenbach am Main, Germany

[21] Appl. No.: 08/912,059

[22] Filed: Aug. 15, 1997

[30] Foreign Application Priority Data

Aug. 23, 1996 [DE] Germany ............ 196 34 088

[51] Int. Cl.⁷ .................................. G03G 15/10
[52] U.S. Cl. ........................................... 399/241
[58] Field of Search .................. 347/55; 430/117, 430/119; 399/241

[56] References Cited

U.S. PATENT DOCUMENTS

| | | | |
|---|---|---|---|
| 4,268,597 | 5/1981 | Klavan et al. | 430/102 |
| 4,432,003 | 2/1984 | Barbero et al. | 346/140 |
| 4,770,967 | 9/1988 | Jackier | 430/117 |
| 5,017,968 | 5/1991 | Oikawa | 355/262 |
| 5,619,234 | 4/1997 | Nagato et al. | 347/55 |
| 5,646,659 | 7/1997 | Moriyama et al. | 347/55 |

FOREIGN PATENT DOCUMENTS

| | | | |
|---|---|---|---|
| 22 07 353 | 12/1972 | Germany . | |
| 40 22 493 | 1/1991 | Germany . | |
| 57-157765 | 9/1982 | Japan | B41J 3/04 |
| 58-173770 | 12/1983 | Japan | G03G 15/10 |
| 60-234852 | 11/1985 | Japan | B41J 3/04 |
| 62-005282 | 1/1987 | Japan . | |
| 62-199451 | 9/1987 | Japan | B41J 3/04 |
| 7-178915 | 7/1995 | Japan . | |
| 08258269 | 10/1996 | Japan | B41J 2/06 |
| 62-005283 | 1/1997 | Japan | G03G 15/10 |

*Primary Examiner*—John Goodrow
*Attorney, Agent, or Firm*—Cohen, Pontani, Lieberman & Pavane

[57] ABSTRACT

A process and a device for the image-differentiated development (inking) of a latent electrostatic image on an image carrier is disclosed, wherein, in an unlimited wide area, a fluid inking agent is applied to the image areas of the image carrier in the form of ink jets. The image areas have a potential $V_B$, which is sufficient, in addition to an offset potential $V_O$ of the nozzles, to produce ink jets, which image the image areas of the image carrier.

17 Claims, 4 Drawing Sheets

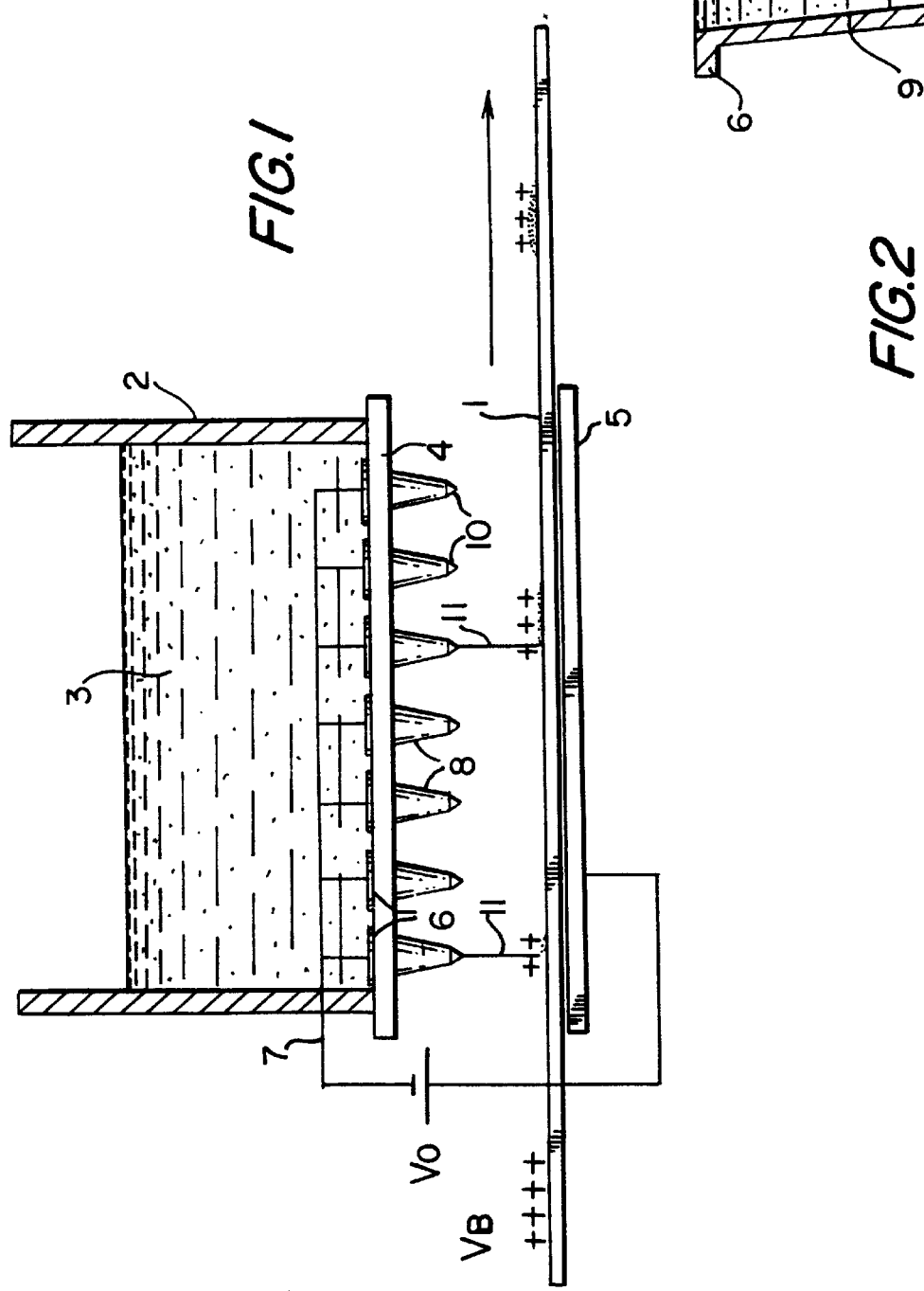

PROCESS AND DEVICE FOR IMAGE-DIFFERENTIATED INKING OF A LATENT ELECTROSTATIC IMAGE

BACKGROUND OF THE INVENTION

1. Field of the Invention

The present invention relates to a process and a device for the image-differentiated inking of a latent electrostatic image with an inking agent, which is applied to the latent image by the effect of electric fields.

2. Description of the Related Art

In electrographic printing processes, as a rule, a charge pattern is applied in accordance with the image to be produced, then the charge pattern is developed with the help of electrically charged ink particles and transferred to a printing stock.

The development stations comprise arrangements in which charged particles are transferred to the electrographic printing form. The charged particles can be either small charged solid particles (dry toner) or charge particles suspended in a non-polar carrier fluid (fluid toner). Higher resolutions can be attained with fluid toners, because of their substantially smaller particle size.

For dry toners, development stations with magnetic brushes or cascade development are known. For fluid toners, bath development and toner application using rollers or sprayers are known.

In all of these processes, the charged ink (toner) is applied to the entire printing form surface in an undifferentiated manner. Differentiation between image locations and non-image locations is then carried out by means of electrostatic forces. A fundamental problem is keeping the last toner residues away from the non-image locations.

With fluid toners, an additional problem arises in that the non-polar carrier fluid moistens the entire printing form surface and must be removed from at least the non-image locations by expensive processes. From U.S. Pat. No. 4,268,597, a process and a device are known for developing an electrostatic image on the surface of an object (e.g., a roller or printing stock) and the object is moved into the vicinity of the surface of a developer fluid, without touching said surface. However, the strength of the electric field and the distance between the surface of the object and the fluid surface in the area of the development zone are such that, with or without an external electric field, the electric field of the latent image attracts the surface of the developer fluid in the direction of the image portions on the surface of the object. As a result, the fluid surface moves onto the electrically attractive areas of the surface of the object, and the imaging material contained in the fluid is deposited on the latent image. The fluid surface is formed, for example, on a roller (e.g., a screen roller) rotating in a container filled with the developer fluid, and the developer fluid is then removed by a blade to a desired thickness. Between a cylinder that carries the image to be developed and the screen roller there is a small air gap, through which the developer fluid passes to the image areas (i.e., the areas carrying an electrostatic image). The cylinder has a photoconductive coating, for example, which is initially charged by corona discharge over its entire surface. The circumferential surface of the cylinder is then partially neutralized by irradiation with light. At the non-neutralized locations, the circumferential surface attracts the developer fluid, and a meniscus is formed. Instead of imaging the cylinder surface, it is also possible to image a printing web that runs over the cylinder and has on its surface a photoconductive layer on which a latent electrostatic image can be created. The imaging process can be assisted by the application of an electric potential difference between the ink application roller, arranged at a distance from the cylinder, and the cylinder.

Using this process, it is not possible to precisely control the passage of the toner onto the imaged surface, and only electrostatically active fluid toners can be used as the inking agent.

Since 1912, an ink-jet principle has been known, which is described in greater detail, for example, in the article "Continuous Gray-Scale Printing with the Electrohydrodynamic Ink-Jet Principle" by D. H. Choi and F. C. Lee in the IBM Research Report RJ 8913 (80000) of Aug. 10, 1992.

In this process, a fluid (ink) meniscus is produced in a thin electrically conductive tube and held there by capillary forces such that the fluid does not leave the tube. If an electric field of a certain size is applied between this tube and a plate located at a suitable distance from the tube, a very thin liquid jet forms, due to electrostatic forces. The liquid jet stops once the electric field is switched off. By actively switching the electric field between individual tubes and the plate in accordance with the image, it is possible to produce an ink-jet image. This principle is used in ink-jet heads, in which each of many tubes that together constitute the print head can be individually addressed electronically. The tubes typically have diameters between 200 and 500 $\mu$m, which attain an ink jet diameter of 15 $\mu$m, for example.

SUMMARY OF THE INVENTION

The object of the present invention is to create a simple imaging process and a simply constructed image-differentiating development system in which a liquid inking agent is used.

An advantage of the invention is that the image carrier can consist of all materials or systems capable of producing a latent electrostatic charge image or at least of holding such an image for the duration of a development procedure. These include, for example, dielectric, ferroelectric and photoconductive materials as well as active image carrier systems, such as those known from DE 40 22 493 C2.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference numerals denote similar elements throughout the several views:

FIG. 1 shows an ink container with nozzles for applying ink to an image carrier;

FIG. 2 shows an enlarged view of a nozzle of the ink container in FIG. 1;

DETAILED DESCRIPTION OF THE PRESENTLY PREFERRED EMBODIMENTS

Figure 3:
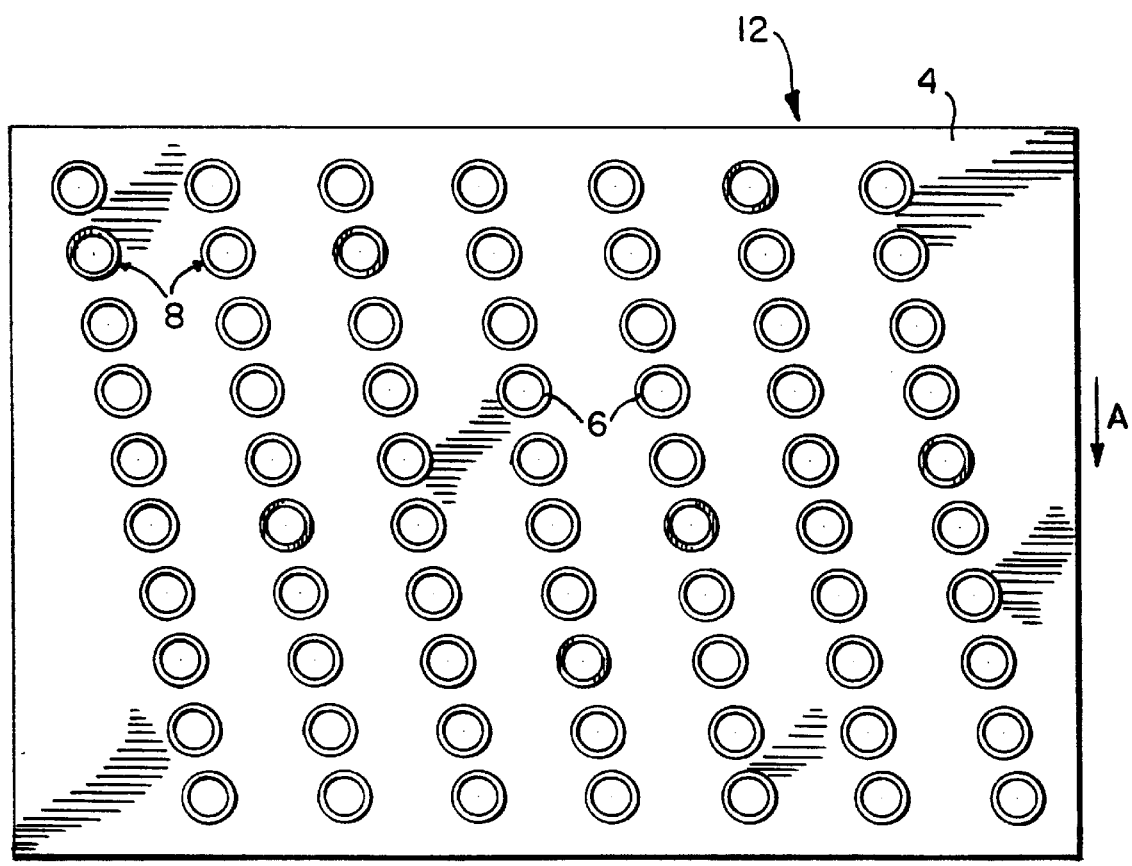
FIG. 3 shows the bottom of the ink container of FIG. 1, viewed from above.

Referring to FIG. 1, a device for the image-differentiating development (inking) of a latent electrostatic image on an image carrier 1 includes a container 2. The container 2 is filled with an inking agent 3. The inking agent 3 is a toner fluid, for example, but can also be any other fluid, such as a low-viscosity fluid, a hot-melt ink, a fluid with high electric conductivity or an insulating fluid. Preferably, the inking agents used can either accept electric charges or react to the application of an electric field in such a manner as to create internal charge distributions. For certain coating uses, e.g., the production of printing forms for offset printing, it can also be advantageous to use transparent inking agents.

On a bottom 4 of the container 2, openings 10 are arranged through which the ink 3 is accelerated out of when a sufficiently large electric potential ($V_O+V_B$) is applied between the openings 10 and the image carrier 1. Here $V_O$ is the offset potential common to all of the openings 10, relative to a system electrode 5, while $V_B$ is the potential of the electrostatically charged pixels on the image carrier 1, relative to the system electrode 5. If the potential $V_O$ is below the emission threshold, the ink remains in the container 2 due to capillary action and/or adhesion.

Either the image carrier 1, i.e., a printing material, has an electrically conductive layer under its layer or layers having a charge distribution in accordance with the image, or a system electrode 5, e.g., an electrically conductive plate, is located below the image carrier 1. The bottom 4 of container 2 is connected on an opposite side of the electric offset potential $V_O$ from the system electrode 5. The bottom 4 need not necessarily consist of an electrically conductive material, however. For example, it is sufficient for the openings 10 in the bottom 4 for the passage of ink 3 to be surrounded by rings 6 of an electrically conductive material and for the rings 6 to have a common potential $V_O$. The rings 6 can be arranged either above (as shown in FIG. 1) or below the bottom 4.

Referring now also to FIG. 2, the rings 6 form the flange of nozzles 8, which extend downward from the bottom 4 of the container 2. Each of the nozzles 8 has an enclosure, which is embodied either as a hollow cylinder or as a hollow truncated cone 9 (shown enlarged in FIG. 2). The interior of the truncated cone 9 is filled with ink 3, which is suspended at the lower end of the nozzle 8 in the form of a drop. The image locations on the image carrier 1 have a potential $V_B$. The potential $V_O$ is selected in such a way as to lie below the potential threshold needed to produce a liquid jet 11 from the openings 10 of the nozzles 8 in the direction of the image locations on the image carrier 1.

It is only the sum of the potentials $V_O+V_B$ that exceeds the potential threshold needed to transfer the ink 3 in the form of a jet onto the image locations of the image carrier 1.

A voltage $U_O$ needed to apply the potential $V_0$ thus constitutes an offset voltage, as known from the aforementioned article by D. H. Choi and F. C. Lee. This article also describes the influence of the diameter of the openings 10 of the nozzles 8 on the density of the ink jet 11. The openings 10 of the nozzles 8 have a diameter between 100 and 500 µm. The distance between the nozzles 8 and the image carrier 1 is, for example, 100 to 1000 µm. Referring also to FIG. 3, the nozzles 8 are arranged into a field in the bottom 4 in such a way that when the container 2 or the image carrier 1 is moved in the direction of Arrow A, all areas of the image carrier 1 can be covered, without gaps, by ink jets 11 or ink droplets that emerge from the nozzles 8. All nozzles 8 have the same electric potential $V_O$. The ink jets 11 or ink droplets have a diameter between 5 and 20 µm. It is thus possible during the imaging process to achieve illustrations that are of much higher resolution than the diameter of the openings 10. This is an important difference from many other imaging processes, in which the size of the openings in a container emitting the inking agent is the measure of resolution.

If the image carrier 1 is electrostatically charged at its pixels to the potential $V_B$ and is then passed below the container 2, an electric field is created in the area of the pixels. The electric field activates an ink jet or droplet and thus causes the transfer of ink 3 to the image carrier 1. At the non-image locations, this electric field is absent, or else lies below the emission threshold needed to produce the ink jets 11. The background therefore remains completely free of ink 3.

According to the invention, a process for applying the ink 3 to the image carrier 1 is thus created in which the ink 3 is transferred, without any additional measures, to only those locations where it is needed. The small diameter of the ink jets 11 permits a high resolution of the print image. Because the diameter of the ink jets 11 is much smaller than that of the openings 10, a diameter for the openings 10 can be selected that is large enough to reliably avoid clogging by particles of ink 3. Even if clogging does occur due to dried ink particles in the region of the openings 10, this clogging is easily cleaned.

Figure 4:
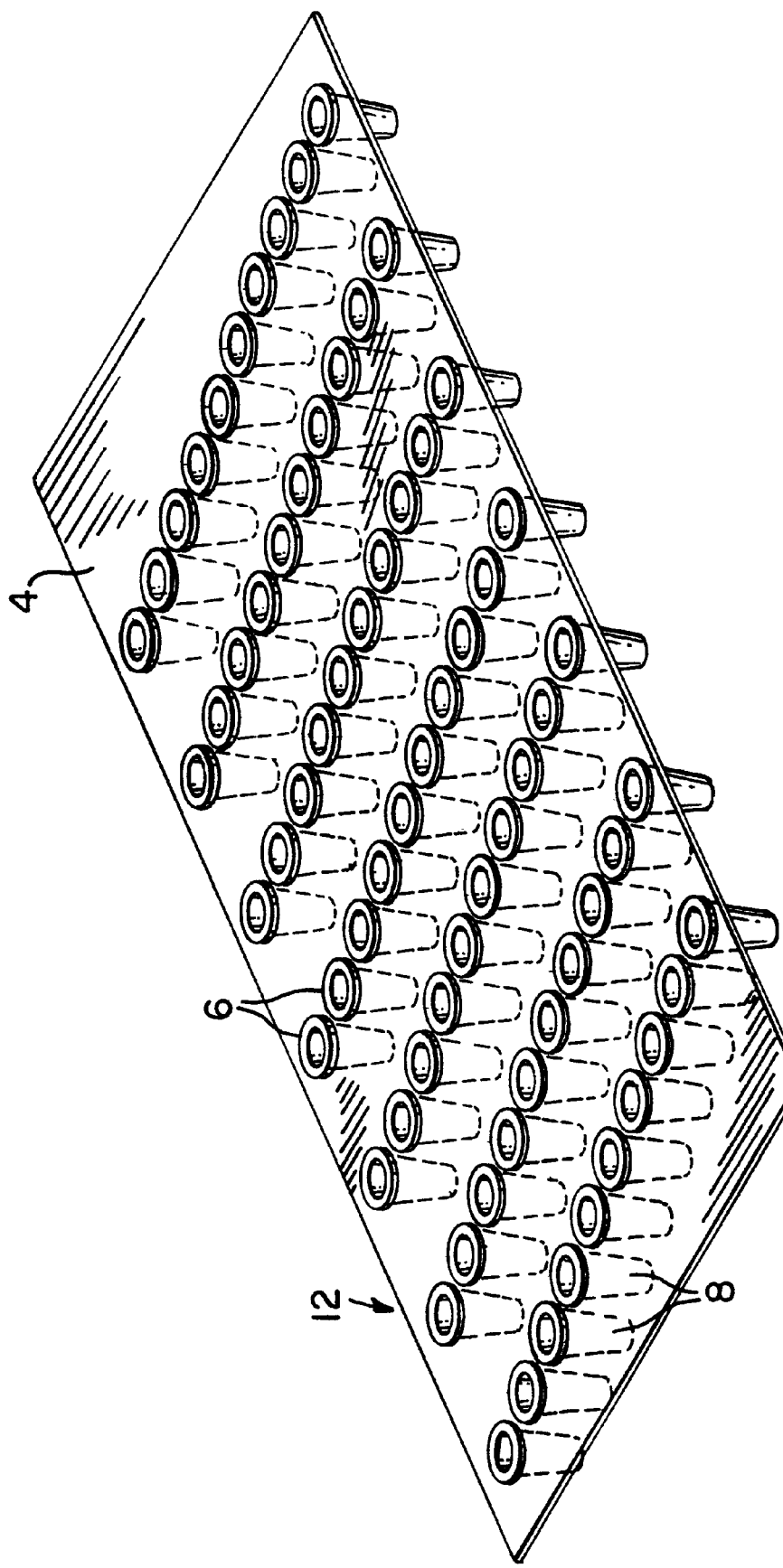
FIG. 4 is a perspective view of the nozzles of FIG. 1.

Referring now to FIG. 4, in another example, the array 12 is arranged below the image carrier 1. In this case, an ink meniscus is produced in the nozzles 8 by means of a slight overpressure of the container 2. In the preferred embodiment, an overpressure of 1 cm water column is used. This arrangement has the advantage that the ink is prevented from dripping out, even in the case of very low-viscosity inks. The meniscus can be controlled by pressure and does not result from gravity alone. As soon as there is an adequate electric voltage ($V_O+V_B$) between the array 12 and the image areas of the image carrier 1, upwardly directed ink jets 11 are produced.

Figure 5:
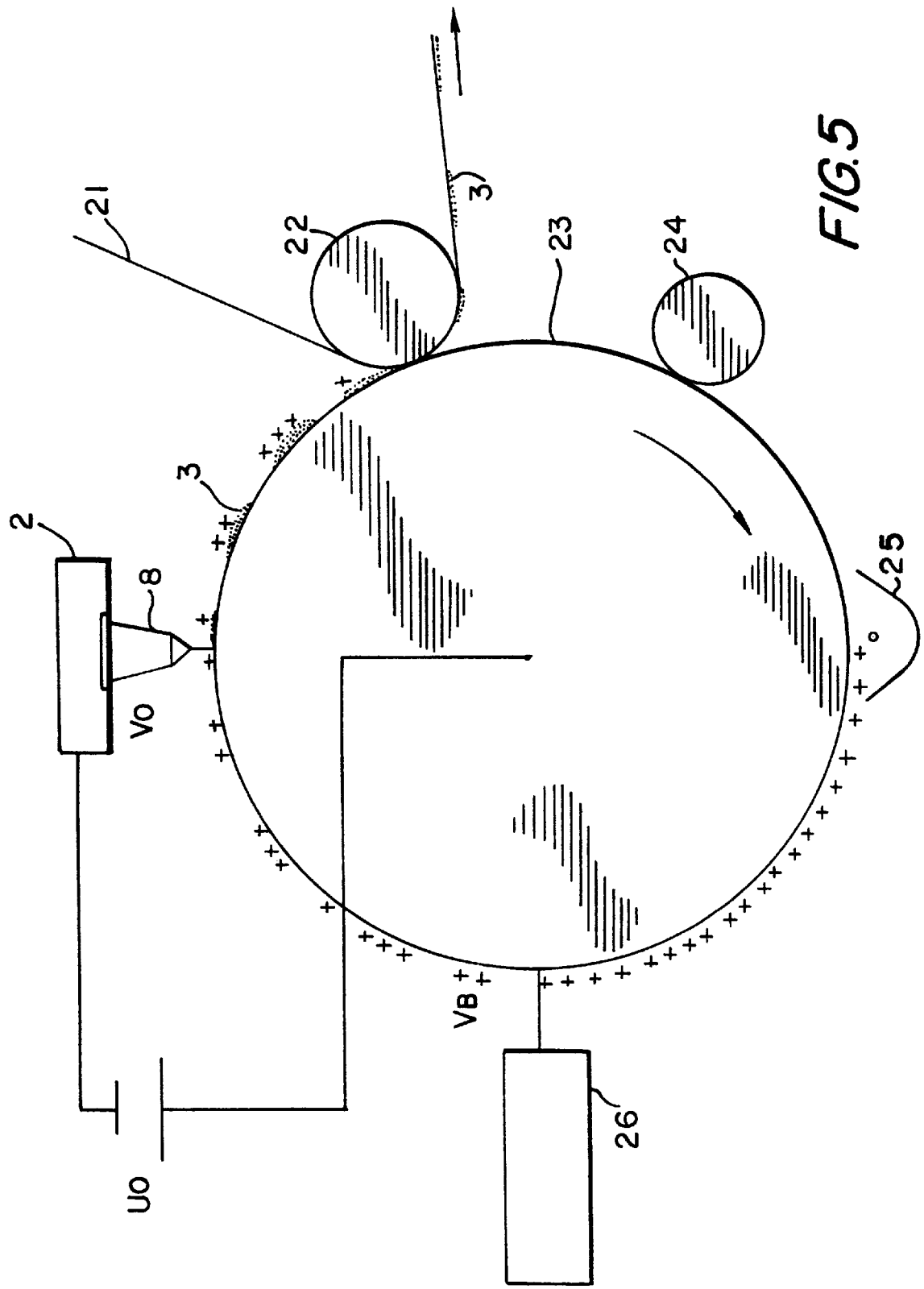
FIG. 5 shows a device for imaging a printing web.

Referring to FIG. 5, in a further example, a printing form 23 of a photoconductor drum, as is normally used in laser printing, is produced. The printing form 23 is charged by a corona charge source 25, to the potential $V_B$. Using a laser imaging unit 26, the photoconductor drum is irradiated and thus made conductive at the non-image locations, so that the charge carriers are discharged at the non-image locations and the surface potential $V_B$ remains only at the image locations. When the bias voltage $U_O$ is applied in accordance with the invention between the nozzles 8 and the photoconductor drum 23, the ink 3 is transferred through the nozzles 8 onto the image locations only. The ink 3 applied in accordance with the image is then transferred by a transfer unit 22 (thermally, by pressure, or electrostatically) onto a printing web 21 or another medium to be printed, such as paper. After the transfer, the photoconductor drum 23 is cleaned by a cleaning unit 24 and discharged.

Instead of ink 3, many different kinds of inking agents can also be used. Fluids with high electrical conductivity as well as electrically non-conductive fluids are suitable. In contrast to the inkjet process with individual activation of the nozzles according to the image, this process allows the use of electrically conductive fluids, because all nozzles 8 are on a common electric potential. Water-based ink is also suitable, for example, as an electrically conductive ink. Preferably, for electrographic printing forms, an electrostatically active fluid toner is used.

Due to the electrostatic forces effective even laterally at short distances, the ink streams 11 focus on the image areas even when these lateral areas are not located directly above the nozzles 8. As a result, the possible resolution is determined primarily by the resolution of the latent electrostatic image. In other words, the attainable resolution of the developed image is higher than the geometric resolution of the nozzles 8 in the array 12.

If a plurality of the nozzles 8 of the array 12 (FIGS. 3 and 4) can be electrically controlled in accordance with a zone of the image carrier 1 separately from the other nozzles 8, e.g., via a shared electric line, the image areas of the image carrier 1 to be inked can accordingly be set on a zone by zone basis. Individual areas of the array 12 can be controlled with electric voltage impulses that produce a different diameter in the fluid jets 11, so that the quantity of sprayed ink is controllable within certain limits. If the nozzles 8 of the array 12 can be individually controlled, as is usual in a conventional ink-jet print head, the device is suitable both for inking the image carrier 1 in accordance with the invention and for the ink-jet process. When used for the conventional ink-jet process, however, the printing speed is limited by the maximum ink-jet frequency and the transmission rate of the image data and the driver electronics. Nonetheless, applications for small runs such as addressing, numbers, etc. are possible.

The invention provides a process and a device for the image-differentiated development (inking) of a latent electrostatic image on an image carrier 1, such as a printing material, whereby in a wide unlimited area, a fluid inking agent, e.g., a fluid toner or an ink 3, is applied to the image areas of the image carrier in the form of ink jets 11. The image areas have on a potential $V_B$, which suffices, in conjunction with an offset potential $V_O$ of the nozzle 8, to produce ink jets 11, which image the image areas of the image carrier 1, based on the processes described in the article by D. H. Choi and F. C. Lee.

The invention is not limited by the embodiments described above which are presented as examples only but can be modified in various ways within the scope of protection defined by the appended patent claims.

We claim:

1. A device for image-differentiated inking of a latent electrostatic image on an image carrier, comprising:

a container containing an inking agent having a plurality of openings on one side of said container;

said one side being electrically conductive at least in an area of each one of said plura openings; and a system electrode positioned a distance from said one side of said container:

said area of each one of said plural openings receiving an offset potential ($V_O$) relative to said system electrode and areas of said latent electrostatic image on said image carrier having an image potential ($V_B$), wherein first areas of said plural openings across from locations of said image carrier that have said latent electrostatic image receive an electric potential ($V_O+V_B$) with respect to said image carrier and second areas of said plural openings across from locations of said image carrier that do not have said latent electrostatic image receive an offset potential ($V_O$) with respect to said image carrier, said offset potential ($V_O$) being lower in value than a potential threshold needed to produce a liquid jet of said inking agent from said openings to said image carrier and said electric potential ($V_O+V_B$) being greater in value than said potential threshold and thereby producing said liquid jet of said inking agent; and said each one of said plural openings comprising a diameter within a range including 100 to 500 $\mu$m and said ink jet produced by said each one of said plural openings having a diameter within a range including 5–20 $\mu$m, wherein said plural opening are arranged so that said ink jet diameters cover all areas of said image carrier as said image carrier is moved between said openings and said system electrode.

2. The device of claim 1, further comprising said electrically conductive areas on said one side of said container comprising rings that surround said openings; and each of said rings receives a common electric potential.

3. The device of claim 1, further comprising an array of said openings on said one side of said container and a first zone of said array being commonly electrically controllable, separately from other zones of said array.

4. The device of claim 3, wherein a form of said container or said array is adjustable to a form of said image carrier.

5. The device of claim 4, wherein said openings are operable for use with a conventional ink-jet process as well as for said image-differentiated inking.

6. The device of claim 1, wherein said openings comprise nozzles.

7. The device of claim 6, wherein said nozzles comprise one of hollow cylinders and hollow truncated cones.

8. The device of claim 6, wherein said nozzles further comprise electrically conductive sidewalls.

9. The device of claim 1, wherein said openings are arranged in rows, and each successive one of said openings in one of said rows being diagonally offset relative to a direction of motion of said image carrier.

10. The device of claim 1, wherein said container is positioned below said image carrier and said container pressurized for producing a fluid meniscus of said inking agent in said openings located on top of said container.

11. The device of claim 3, wherein said inking agent comprises one of a low viscosity fluid and a high-viscosity fluid that is one of non-conductive and electrically conductive and is water-based.

12. The device of claim 1, wherein said image carrier comprises one of a printing stock with said latent electrostatic image and a printing form with said latent electrostatic image.

13. The device of claim 12, wherein said printing form is placed on a form cylinder and is imaged by said container when said offset potential is applied between the container and the printing form.

14. The device of claim 13, wherein said printing form comprises a photoconductor drum.

15. The device of claim 13, further comprising a cleaning unit operatively connected for renewing a surface of the printing form by removing all charges from said surface.

16. The device of claim 15, wherein said form cylinder and said container are arranged in a printing machine.

17. The device of claims 13, wherein said container further comprises an outer wall located at a distance from said form cylinder, said outer wall being curved in the shape of a circular arc and whose curvature radius corresponds to a radius of said form cylinder.

* * * * *